United States Patent

Takeuchi et al.

[11] Patent Number: 5,867,083
[45] Date of Patent: Feb. 2, 1999

[54] PROTECTIVE DEVICE FOR SURGE CURRENT PROTECTION OF ASSOCIATED EQUIPMENT IN COMMUNICATIONS SYSTEMS

[75] Inventors: Haruyuki Takeuchi, Matto; Michio Miyazaki; Tadao Bekku, both of Komatsu, all of Japan

[73] Assignee: Murata Manufacturing Co., Ltd., Nagaokakyo, Japan

[21] Appl. No.: 672,314

[22] Filed: Jun. 28, 1996

[30] Foreign Application Priority Data

Jun. 29, 1995 [JP] Japan ................................. 7-164117

[51] Int. Cl.⁶ .......................... H01H 37/00; H02H 5/04
[52] U.S. Cl. .................. 337/1; 337/14; 337/298; 361/27; 361/106; 338/22 R; 338/7
[58] Field of Search .................. 337/21, 24, 159, 337/161, 180, 181, 182, 183, 184, 221, 293, 297, 405, 416, 1, 14, 35, 298, 401; 361/58, 103, 106, 27; 338/7, 25, 22 R, 23; 422/94, 95

[56] References Cited

U.S. PATENT DOCUMENTS

| | | | |
|---|---|---|---|
| 3,978,443 | 8/1976 | Dennis et al. | 337/297 X |
| 4,494,104 | 1/1985 | Holmes | 337/403 |
| 5,204,799 | 4/1993 | Stibila | 361/104 |
| 5,254,969 | 10/1993 | Caddock, Jr. | 337/297 X |
| 5,379,022 | 1/1995 | Bacon et al. | 338/20 |

FOREIGN PATENT DOCUMENTS

Hei 3-5135   1/1991   Japan .

Primary Examiner—Gregory Thompson
Assistant Examiner—Jayprakash N. Gandhi
Attorney, Agent, or Firm—Burns, Doane, Swecker & Mathis, LLP

[57] ABSTRACT

A small-size high-performance electronic protective device (10) is provided for use in protecting communication equipment including an exchange servicing module against application of abnormal surge current due to accidental shorts between adjacent ones of power feed lines in a communications system. The protective device (10) includes positive thermistors (3a, 3b) connected between communication link input terminals (1a, 1b) and output terminals (1c, 1d) coupled to an associative equipment being protected. The protective device (10) also includes thick-film resistive elements (5a, 5b), which are connected in parallel with the thermistors (3a, 3b), respectively.

15 Claims, 6 Drawing Sheets

PROTECTIVE DEVICE FOR SURGE CURRENT PROTECTION OF ASSOCIATED EQUIPMENT IN COMMUNICATIONS SYSTEMS

BACKGROUND OF THE INVENTION

1. Field of the Invention

The present invention relates generally to protective devices for communications systems, and more particularly, to electronic communication-line protectors for protection of associated communication equipment such as exchange servicing modules against the occurrence of abnormal or surge current as possibly induced by accidental shorts of power transmission lines.

2. Description of Related Art

Conventionally, protective devices for use in protecting associative equipment in communications systems are known, one of which has been disclosed, for example, in Published Unexamined Japanese Patent Application (PUJPA) No. 3-5135. A configuration of the prior known protective device is shown in FIG. 8, wherein this device is generally designated by numeral 40. The protective device 40 includes a pair of gas tube arresters 41a, 41b, which are interconnected in series between two lines A, B coupled to input terminals which are linked to communication lines. The series combination of gas tube arresters 41a, 41b has a common node coupled to ground. The protective device 40 also includes a series combination of variable resistors or "varistors" 43a, 43b connected between the lines A, B at the output terminals, which are in turn connected to target equipment being protected. The series combination of varistors 43 has a common node grounded, and is parallel with the series combination of gas tube arresters 41a and 41b. Provided between these series combinations 41, 43 are a pair of a positive thermally sensitive resistor or "thermistor" 45a and a thick-film resistive element 47a inserted in series in a first line A, and another pair of a positive thermistor 45b and its associated thick-film resistor 47b in the other line B as shown.

As generally known in the art, the positive thermistors 45a, 45b suffer from a problem in that possible variations in resistance are as large as about 20 percent (%). In this case, in order to decrease the amount of impedance imbalance between the lines A, B, the thick-film resistors 47a, 47b are trimmed in shape to ensure that the resulting combined resistance value of the positive thermistors 45 and thick-film resistors 47 falls within a limited range of accuracy of approximately 1%.

With the communication-line protective device 40, when surge current enters or "invades" from the communication-line linkage input terminals due to accidental electrical shorts between adjacent ones of the power feed lines, the positive thermistors 45a, 45b self-heat and rapidly increase the resistance values thereof, thereby attempting to provide protection for the associative equipment being protected by suppressing or eliminating the applied surge current.

Unfortunately, the prior known protective device 40 has encountered several problems. The surge current protection scheme does not come without accompanying penalties: first, the quality of voice information or data under communication may be degraded; second, the circuit board is increased in area needed for mounting the positive thermistors 45a, 45b thereon.

More specifically, the positive thermistors 45 exhibit a resistance-to-temperature characteristic that is relatively large in the variation ratio of resistance to ambient temperature even at temperatures below the Curie temperature, with its deviations being increased. This serves to adversely affect the impedance imbalance amount as follows. Even in the case where the combined resistance value of the positive thermistors 45 and thick-film resistors 47 can be at one time optimized in accuracy, if ambient temperature varies, a difference may arise between the resulting resistance values of the first thermistor/resistor pair (45a, 47a) associated with the first line A and of the second thermistor/resistor pair (45b, 47b) with second line B, due to the occurrence of deviations in the temperature characteristics of the respective thermistors 45a, 45b. Such an increase in impedance imbalance between the lines A, B causes degradation in voice quality at exchange servicing modules such as private branch exchanges (PBXs).

In addition, it should be strictly required that the positive thermistors 45a, 45b be relatively large in size in order to ensure that they may withstand the application of surge current or eliminate the occurrence of any firing even under destruction in the worst case. Obviously, this causes the associative printed circuit board on which the thermistors 45 are mounted to increase in area accordingly.

SUMMARY OF THE INVENTION

It is therefore an object of the present invention to provide a new and improved protective device which avoids the drawbacks encountered with the prior art approach.

It is another object of the invention to provide an improved protective device capable of reliably protecting associated communication equipment against abnormal or surge current externally applied thereto.

It is a further object of the invention to provide a small-size high-performance protective device for use in communications systems capable of reliably protecting associated communication equipment against application of surge current due to electrical shorts of power feed lines.

The foregoing objects may be achieved by providing an electronic device for protection of a communication line having an input node coupled to the communication line and an output node linked to target equipment being protected, which device includes a positive thermistor between the input node and the output node. The device also includes a thick-film resistive element in parallel with the positive thermistor.

In accordance with another aspect of the invention, the device further includes a ceramic circuit board or substrate having a top surface and a bottom surface, on each of which a parallel combination of the thermistor and the resistive element is provided. When an incoming abnormal current from the input node exceeds a rated value corresponding to the allowable power of the associated communication equipment, the ceramic circuit board will be partially cracked due to heat generation of the thick-film resistive element causing a corresponding part of electrical circuitry thereon to be opened or "open-circuited."

With such an arrangement, the use of a parallel combination of the positive thermistor and thick-film resistive element may provide a combined resistance that is less than the resistance of the positive thermistor alone, thus enabling the resistance-to-temperature characteristic to be enhanced as compared to the use of a single positive thermistor.

Another advantage of the invention is that high reliable safety against abnormal surge current can be retained for the associated communication equipment. This may be attained by rapidly isolating the equipment when any surge current, which will possibly enter from the communication line linkage input terminals due to accidental shorting of power lines, is increased in potential to go beyond a predefined allowable power level. The rapid isolation of such equipment being protected is specifically accomplished by facilitating or accelerating the ceramic circuit board of the protective device to partly crack upon application of heat generated from the thick-film resistive element, causing a corresponding electrical line path to the equipment to be physically destroyed. The equipment can thus be electrically disconnected or "wrapped" from the associative communication lines with maximized safety being retained for invasion of any surge current.

These and other improvements are set forth in the following detailed description. For a better understanding of the invention with advantages and features, refer to the description and to the accompanying drawings.

BRIEF DESCRIPTION OF THE DRAWINGS

FIG. 7A shows a top plan view of a protective device in accordance with a further embodiment of the invention, whereas

DETAILED DESCRIPTION OF THE INVENTION

Figure 1:
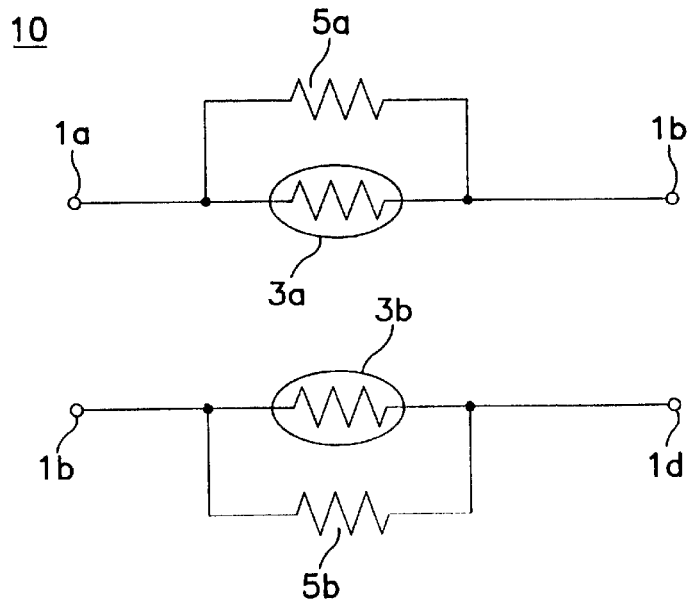
FIG. 1 is a circuit diagram of a communication line protection device in accordance with one preferred embodiment of the invention.

Referring to FIG. 1, a communication line protection device in accordance with one preferred embodiment of the invention is generally designated by the numeral 10. Basically, the protective device 10 has a pair of input terminals 1a and 1b, which are linked to communication lines. The protective device 10 also has a pair of output terminals 1c, 1d operatively coupled to an associated equipment being protected, including a known exchange servicing module such as a PBX. A parallel combination of a first positive thermally sensitive resistor or "thermistor" 3a and a first thick-film resistive element 5a coupled in parallel with each other is electrically connected between one input terminal 1a and its corresponding output terminal 1c. Similarly, another parallel combination of a second positive thermistor 3b and a second thick-film resistive element 5b is inserted between the remaining input and output terminals 1b, 1d. Note that the thick-film resistors 5a, 5b are specifically arranged in shape in such a manner that these are trimmed causing a combined resistance value of a respective one of the thermistor/resistor combinations 3, 5 (3a, 5a; 3b, 5b) to fall within a limited range of variation that corresponds to the accuracy of ±1 percent (%), for example. This may ensure that the impedance imbalance amount between the first pair of input/output terminals 1a, 1c and the second pair of input/output terminals 1b, 1d remains as small as possible.

Figure 2:
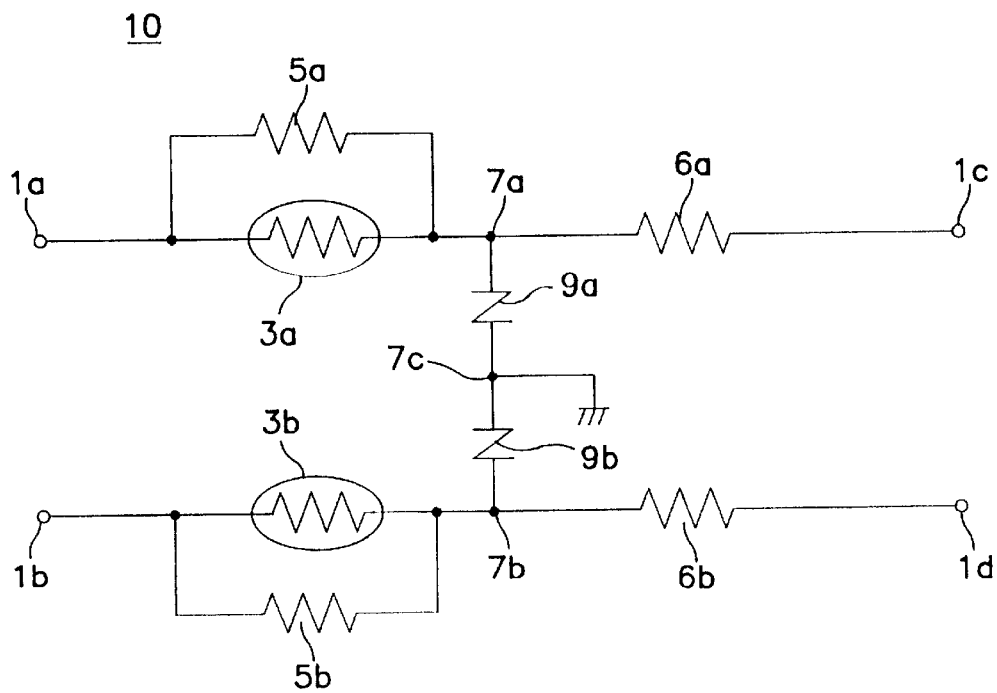
FIG. 2 shows a circuit configuration of one possible modification of the protective device shown in FIG. 1.

As necessary, the impedance imbalance amount reduction scheme may alternatively be modified as follows. FIG. 2 shows a modified configuration of the protective device 10. This circuitry may be similar to that of FIG. 1 with third and fourth thick-film resistive elements 6a, 6b being inserted between the first and second thermistor/resistor pairs and their corresponding output terminals 1c, 1d, respectively. More specifically, a first thick-film resistor 6a is serially interconnected between the first parallel combination of the first thermistor 3a and the first resistor 5a and the output terminal 1c, whereas the second thick-film resistor 6b is serially interconnected between the second parallel combination of the second thermistor 3b and the second resistor 5b and its associative output terminal 1d. Either the additional thick-film resistors 6 or all of the thick-film resistors 5, 6 are trimmed in shape so as to decrease the impedance imbalance amount between the first input/output pair 1a, 1c and the second input/output pair 1b, 1d.

In addition to the third and fourth resistors 6a, 6b, the protective device of FIG. 2 further includes a series combination of two variable resistors or "varistors" 9a, 9b which may be interconnected between first and second circuit nodes 7a, 7b. The first node 7a is a common node of the third resistor 6a and the first parallel combination of thermistor 3a and resistor 5a; the second node 7b is a common node of the fourth resistor 6b and the second parallel combination of thermistor 3b and resistor 5b. The series-connected varistors 9a, 9b has a common node 7c coupled to ground as shown.

Figure 3:
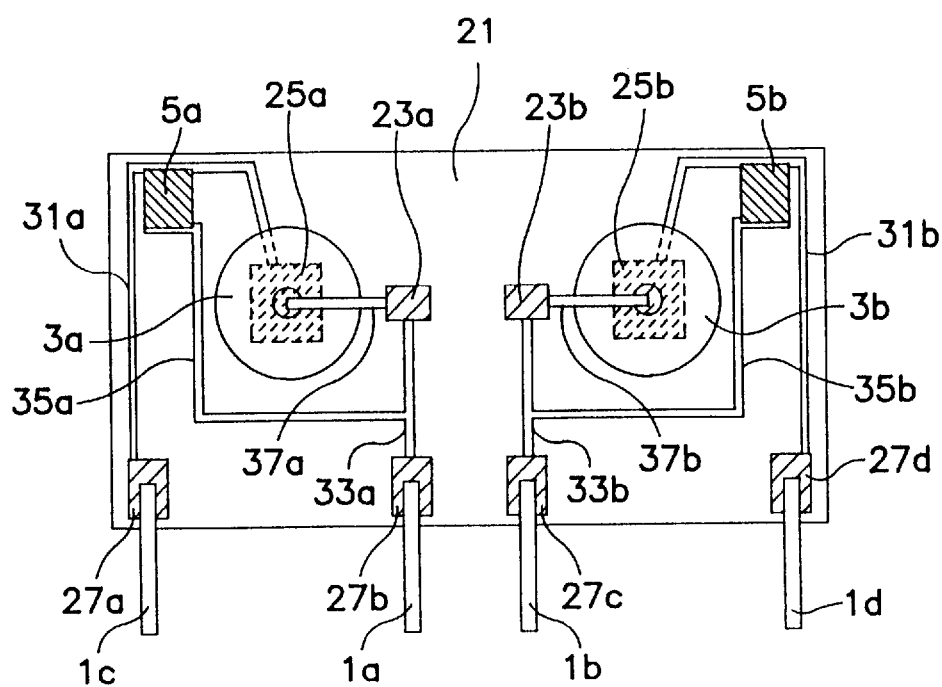
FIG. 3 illustrates a top plan view of the protective device of FIG. 1.

A detailed planar arrangement of the protective device 10 is shown in FIG. 3, wherein the device 10 includes a rectangular circuit board or substrate 21 which may be made of ceramic material, such as alumina, for example. Centrally arranged on the top surface of the substrate 21 is a pair of electrode pads 23a, 23b for making contacts with metal lead wires 37a and 37b connected to an upper surface of the first and second thermistors 3a and 3b, respectively. Electrodes 25a, 25b for attachment of the positive thermistors 3a, 3b are provided on the side of the thermistors 3a and 3b opposite to electrode pads 23a, 23b. The substrate 21 has a lower peripheral edge portion whereat four contact electrodes 27a, 27b, 27c, 27d are arrayed at predefined intervals to which the input and output terminals (1a, 1b; 1c, 1d) are attached. At the opposite corners of the upper peripheral edge of the substrate 21, the thick-film resistive elements 5a, 5b are mounted by use of known printing techniques. These resistors 5 may be comprised of a ruthenium dioxide ($RuO_2$) based material.

The first positive-thermistor attachment electrode 25a and its associated terminal contact electrode 27a are electrically connected together by a first conductive line 31a, which is formed by known patterning techniques to extend along the upper edge and the left side edge of the substrate 21 on the top surface thereof. The first metal wire contact pad 23a is connected to the terminal contact electrode 27b via another conductive line 33a which runs across the width of substrate 21. The first thick-film resistor 5a is arranged on the substrate surface in such a manner that it is located at a specific position to ride on part of the conductive line 31a at its upper edge and has one diagonally opposed corner being coupled to an L-shaped conductive line 35a, which is in turn connected at its opposite end to the pad/contact connection line 33a as shown in FIG. 3.

Electrical interconnection lines for the other thick-film resistor 5b, pad 23b and thermistor attachment electrode 25b are symmetrically arranged with those for the aforesaid parts 5a, 23a, 25a along the width of substrate 21 to provide a right-to-left symmetrical wiring pattern on the substrate surface. More specifically, the remaining positive-thermistor attachment electrode 25b is electrically coupled to the rightmost terminal contact electrode 27d by way of a conductive line 31b that runs along the upper and right periphery of the substrate 21. The other metal wire contact pad 23b is connected to the terminal contact electrode 27c at the lower substrate periphery by a conductive line 33b which across the width of the substrate 21. The second thick-film resistor 5b is placed at the upper right corner of substrate 21 to partly overlap the line 31b and also has its one diagonally opposed lower corner that is connected by a reverse L-shaped conductive line 35b to the pad/contact interconnection line 33b.

As shown in FIG. 3, the thermistors 3a, 3b of circular plate or coin-like shape are mounted on the substrate 21 at selected positions that correspond to the locations of electrodes 25a, 25b respectively so that they reside on such electrodes 25 as designated by solid circles shown. These coin-like thermistors 3 may be comprised of a chosen ferroelectric material, here barium titanate ($BaTiO_3$).

A respective one of the thermistors 3a, 3b has electrodes disposed on the opposite surfaces thereof, one of which is electrically connected by known soldering techniques to a corresponding one of the thermistor attachment electrodes 25a, 25b on the substrate 21. The other electrodes of each thermistor 3a, 3b is connected by soldering to a corresponding one of the metal lines 37a, 37b attaining electrical connection with an associated one of the pads 23a, 23b. Additionally, the input terminals 1a, 1b are connected by soldering to the intermediate contacts 27b, 27c, whereas the output terminals 1c, 1d are soldered to the outer opposite contacts 27a, 27d, respectively.

Figure 4:
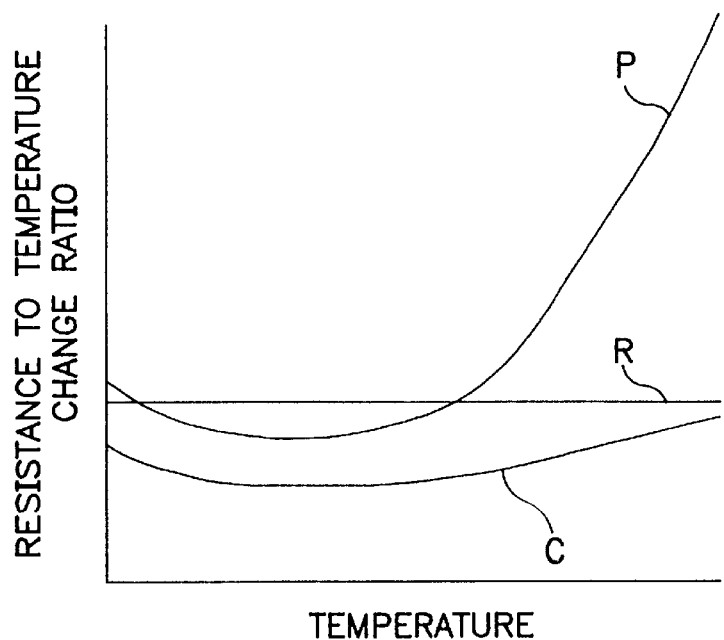
FIG. 4 is a graph showing the resistance-to-temperature characteristic curves of a positive thermistor, a thick-film resistor, and a composite resistor thereof.

With the communication-line protective device 10 thus arranged, the positive thermistors 3a, 3b may exhibit a specific resistance-to-temperature characteristic as shown in FIG. 4, wherein the resistance-to-temperature variation ratio of the positive thermistors 3a, 3b per se remains relatively large even at temperatures below the Curie temperature as demonstrated by a characteristic curve P of FIG. 4. By adding to such positive thermistors 3a, 3b the parallel connection of the thick-film resistors 5a, 5b (which have substantially flat resistance-to-temperature characteristic as demonstrated by curve R in FIG. 4), a combined resistance is obtained for each parallel combination of thermistor 3 and resistor 5. This results in achievement of an excellent resistance-to-temperature characteristic as demonstrated by curve C in FIG. 4, which enables the resulting circuitry to be less in resistance-versus-temperature variation ratio than the circuitry with thermistors 3a, 3b alone without accompanying any thick-film resistors 5 as found in the prior art. This may serve to reduce the width of any possible variations in the resistance-to-temperature characteristic of the combined resistance of the thermistors 3 and thick-film resistors 5, causing a difference between the combined resistances of the first and second thermistor/resistor combinations (3a, 5a; 3b, 5b) to decrease as well, which difference will possibly take place due to changes in ambient temperature. The reduction of combined resistance difference may lead to the possibility of suppression or elimination of any unwanted increase in amount of imbalance between the impedance of the input/output terminals 1a, 1c and that of the input/output terminals 1b, 1d. It is thus possible to suppress or eliminate a reduction in communication quality of the PBX being protected.

Another significant advantage of the protector 10 is that parallel connections of thick-film resistors 5a, 5b with the positive thermistors 3a, 3b enable the resulting respective combined resistances to be adjusted less in value than the resistance of thermistors 3 per se. Consequently, even when the thermistors 3 are increased in size, it becomes possible to suitably adjust both the resistance value between the input and output terminals 1a, 1c and that between the input and output terminals 1b, 1d to ensure that the direct current (DC) resistance of PBX is kept smaller.

Figure 5:
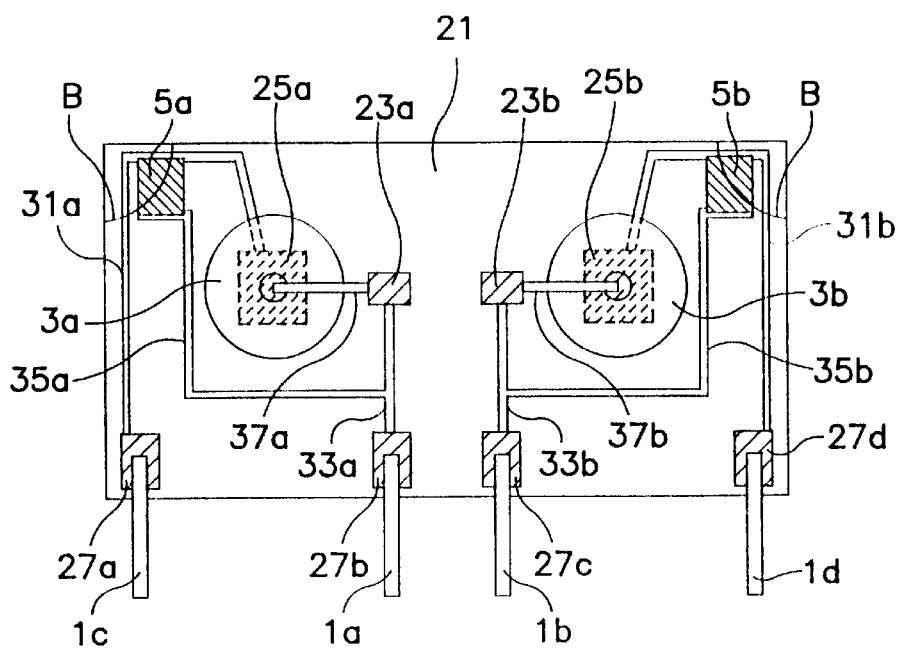
FIG. 5 is a pictorial representation of the protective device of FIG. 3 having a circuit board with a crack due to heat generation from a thick-film resistive element thereon.

A further advantage of the protector 10 is that while the positive thermistors 3a, 3b may be responsive to application or "invasion" of surge current from the input terminals 1a, 1b due to accidental contacts of power feed lines, for generating heat to increase the resistance values of thermistors 3, it is possible even under such circumstances to optimally design the device structure so that the thick-film resistors 5 are greater in heat release temperature than the thermistors 3. And, when the heat release temperature of thick-film resistors 5 is at a certain temperature, the substrate 21 will be forced to partly crack first at specific portions whereat the thick-film resistors 5 are placed thereon due to temperature differences between the specific portions and the adjacent portions surrounding them, as demonstrated by the inclusion of solid lines B in FIG. 5.

This results in partial destruction or cutoff of the conductive lines 31a, 31b formed near the mounting positions of thick-film resistors 5a, 5b to open an electric circuit at corresponding portions, thus enabling successful prohibition against invasion of any undesired surge current toward the associative PBX being protected. It is thus possible to successfully protect the PBX against any possible invasion of abnormal current from the outside by causing the substrate 21 to partly crack to immediately open a corresponding part of the electric circuit through which surge current attempts to enter the PBX due to accidental shorts of adjacent power lines outside. Note here that while the temperature whereat the substrate 21 begins cracking is about 600° C., such cracking temperature may be set at any desired alternative values by suitable selection of the resistance values of thick-film resistors 5a, 5b to ensure that the substrate 21 will be able to crack upon application of any surge current of different values above the allowable power level of the positive thermistors 3 and thick-film resistors 5 used. This can avoid, unlike the prior art, the need for use of unnecessarily large sized parts or components in order to prevent the positive thermistors from firing, thus reducing the size of protective device 10 as a whole.

Figure 6:
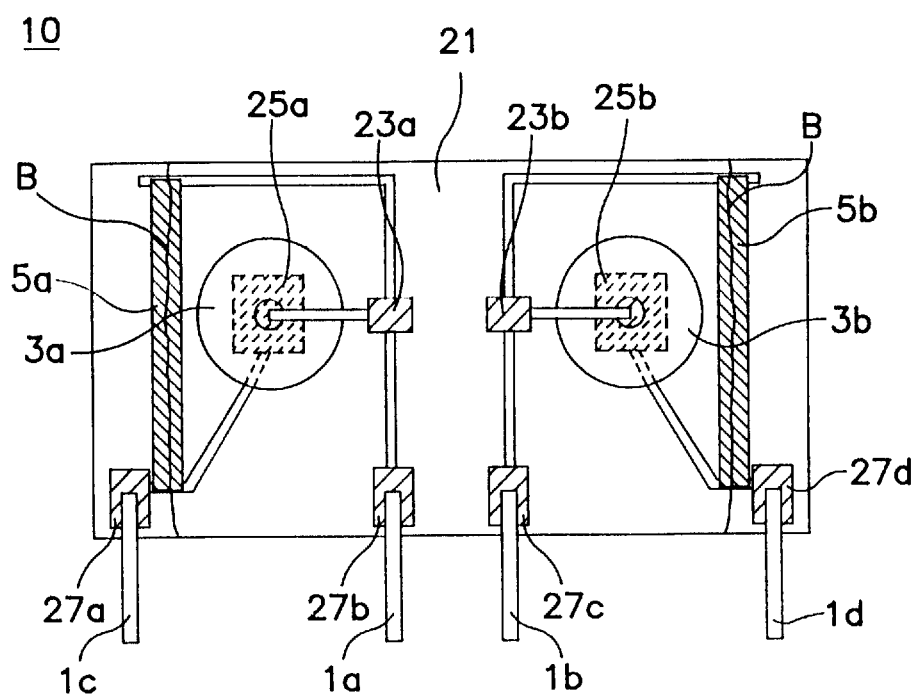
FIG. 6 shows a top plan view of a protective device in accordance with another embodiment of the invention.

In the illustrative embodiment the thick-film resistors 5a, 5b are placed near the conductors 31a, 31b on the substrate 21; however, the present invention should not be limited exclusively to such arrangement and may be freely modified in mounting position thereof by those skilled in the art without requiring any inventive activity, to the extent that the resistors 5 offer the possibility of rapid interruption or cutoff of electric line path for invasion of surge current from the outside into the PBX being protected. For instance, the protector 10 may alternatively arranged as shown in FIG. 6 such that the thick-fihn resistors 5a, 5b are each constituted from an elongate strip that extends along the width of substrate 21 thereon while allowing the substrate 21 to crack along its width as demonstrated by a waved solid line B, which is added for convenience of explanation only.

Figure 7A:
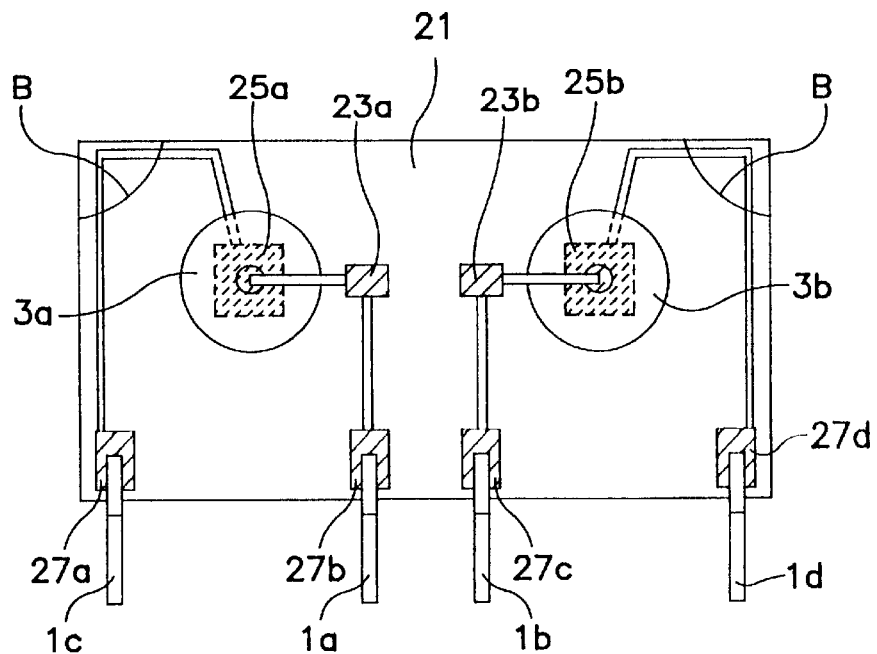
Figure 7B:
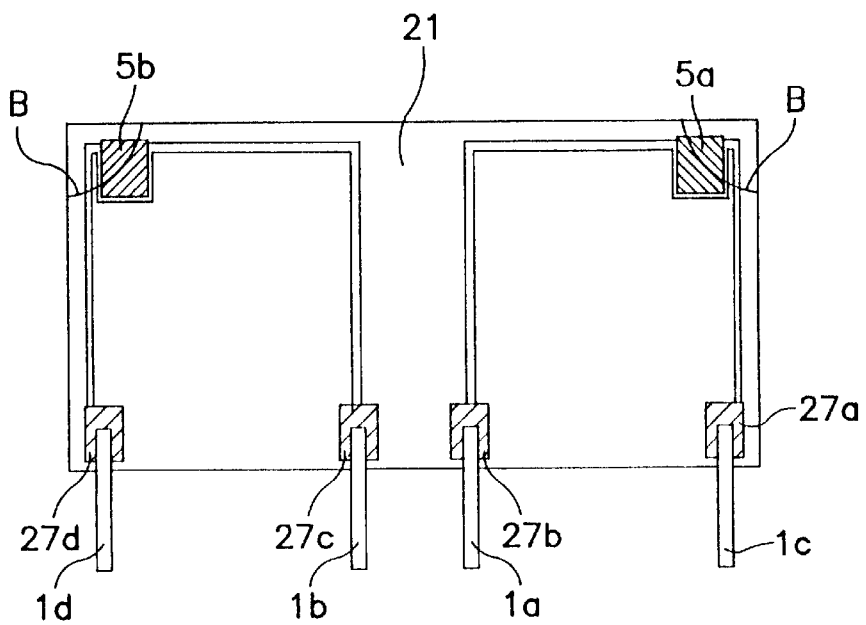
FIG. 7B illustrates a bottom plan view of the device shown in FIG. 7A.
Figure 8:
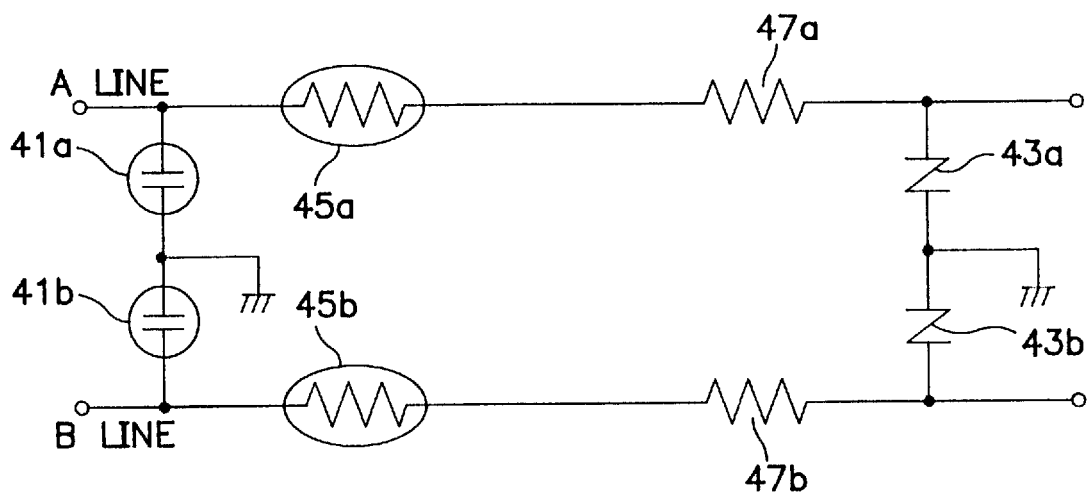
FIG. 8 is a circuit diagram of one prior known protective device.

A further modification of the communication-line protector 10 is shown in FIGS. 7A and 7B. This device is similar to that of FIG. 3 with the thick-film resistors 5a, 5b being disposed on the bottom surface of the substrate 21 as readily seen from FIG. 7B, and with the terminal contacts 27a–27d being replaced by double-surface contacts each of which has top and bottom surface contact electrodes being electrically coupled together by use of known through-going contact holes. Preferably, a respective one of the input and output terminals 1a–1d may be designed to have at one terminate end a U-shaped metallized damper portion which may mate with or "bite" a corresponding one of double-surface contacts 27a–27d at the lower edge of substrate 21 to be electrically coupled thereto by known soldering techniques. Each positive thermistor 3a, 3b on the top substrate surface is electrically parallel-connected with its associated thick-film resistor 5a, 5b on the rear surface with the input/output terminals 1a–1d being as common nodes thereof. With such "double-surface mount" structure for the positive thermistors 3 and thick-film resistors 5, the substrate 21 will be able to begin cracking first at its bottom surface as demonstrated by additionally depicted solid lines B in FIG. 7B.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for protection of equipment operatively coupled to other equipment having an input coupled to a line and an output coupled to the equipment being protected, said device comprising:
    a thermistor connected between the input and the output of said device; and
    a resistive element connected in parallel with said thermistor;
    a ceramic substrate supporting a parallel combination of said thermistor and said resistive element; and
    means for, when an incoming abnormal current from said input is at or above a rated power level, causing said substrate to partially break due to heat generation of said resistive element to open electrical circuitry thereon.

2. A device for surge protection, said device comprising:
    a film resistive element;
    a ceramic substrate supporting said film resistive element and at least one electrical line interconnecting other circuit elements; and
    a thermistor connected in parallel to said film resistive element,
    wherein said film resistive element is positioned on said substrate at a location and having a configuration such that, when an incoming abnormal current from said input is at or above a rated power level, said substrate is caused to partially break due to heat generation of said film resistive element and thereby open an electrical interconnection line thereon, and
    wherein said film resistive element is a thick film resistive element part of which overlies an electrical connection line connecting said thermistor to an input and to an output of said device.

3. A device for protection of equipment operatively coupled to other equipment having an input coupled to a line and an output coupled to the equipment being protected, said device comprising:
    a thermistor connected between the input and the output of said device; and
    a resistive element having a substantially flat resistance-to-temperature ratio connected in parallel with said thermistor.

4. A device for protection of equipment operatively coupled to communication lines, said device comprising:
    an input coupled to a communication line and an output linked to the equipment being protected;
    a positive thermistor connected between the input and the output of said device;
    a resistive element connected in parallel with said positive thermistor;
    a ceramic substrate having a top surface and a bottom surface supporting a parallel combination of said thermistor and said resistive element; and
    means for, when an incoming abnormal current from said input is at or above a rated level corresponding to an allowable power, causing said substrate to partially break due to heat generation of said resistive element to open electrical circuitry thereon.

5. The device according to claim 4, wherein one of said top and bottom surfaces supports said resistive element and the other of said top and bottom surfaces supports said thermistor.

6. The device according to claim 4, wherein one of said top and bottom surfaces supports both said resistive element and said thermistor.

7. The device according to claim 4, wherein said means for causing said substrate to partially break includes a location and configuration of said resistive element over an interconnection line on said substrate.

8. A device for protection of equipment operatively coupled to lines, said device comprising:
    an input coupled to a line and an output linked to the equipment being protected;
    a positive thermistor connected between the input and the output of said device; and
    a resistive element having a substantially flat resistance-to-temperature ratio connected in parallel with said positive thermistor.

9. The device according to claim 1, further comprising:
    a second input coupled to a different line and a second output linked to the equipment being protected;
    a second positive thermistor connected between the second input and the second output of said device; and
    a second resistive element having a substantially flat resistance-to-temperature ratio connected in parallel with said positive thermistor.

10. The device according to claim 9, further comprising:
    a ceramic substrate having a top surface and a bottom surface supporting parallel combinations of said thermistors and said resistive elements; and
    means for, when an incoming abnormal current from said input is at or above a rated level corresponding to an allowable power, causing said substrate to partially break due to heat generation of at least one of said resistive element to open electrical circuitry thereon.

11. The device according to claim 10, wherein one of said top and bottom surfaces supports said resistive elements and the other of said top and bottom surfaces supports said thermistors.

12. The device according to claim 10, wherein one of said top and bottom surfaces supports both said resistive elements and said thermistors.

13. The device according to claim 10, wherein said means for causing said substrate to partially break includes a location and configuration of at least one of said resistive element over an interconnection line on said substrate.

14. A method for protection of equipment operatively coupled to lines, said method comprising the steps of:

providing an input coupled to a line and an output linked to the equipment being protected;

providing a positive thermistor connected between the input and the output of said device; and providing a resistive element having a substantially flat resistance-to-temperature ratio connected in parallel with said positive thermistor.

15. A method for protection of equipment operatively coupled to lines, said method comprising the steps of:

providing an input coupled to a line and an output linked to the equipment being protected;

providing a positive thermistor connected between the input and the output of said device;

providing a resistive element connected in parallel with said positive thermistor;

providing a ceramic substrate having a top surface and a bottom surface supporting a parallel combination of said thermistor and said resistive element; and when an incoming abnormal current from said input is at or above a rated level corresponding to an allowable power, causing said substrate to partially break due to heat generation of said resistive element to open electrical circuitry thereon.

* * * * *